May 12, 1925.  
F. LÖSEL  
ELASTIC FLUID TURBINE  
Filed Aug. 4, 1923

1,537,175

Inventor  
F. Lösel  
By Marks & Clerk  
Attys.

Patented May 12, 1925.

1,537,175

UNITED STATES PATENT OFFICE.

FRANZ LÖSEL, OF BRUNN, CZECHOSLOVAKIA.

ELASTIC-FLUID TURBINE.

Application filed August 4, 1923. Serial No. 655,721.

*To all whom it may concern:*

Be it known that I, FRANZ LÖSEL, a citizen of Czechoslovakia, and residing at Brunn, Czechoslovakia, have invented certain new and useful Improvements in and Relating to Elastic-Fluid Turbines, of which the following is a specification.

My invention relates to elastic fluid turbines, particularly multistage high-pressure turbines of the kind comprising single rotary multistage elements with rigid shafts. The primary object of the invention is to reduce or avoid leakage at the glands and also between the stages, while reducing particularly the diameter and also the length of the rotor shaft to a safe minimum, whereby the crictical speed and, hence, also the turbine performance, reliability and security are considerably improved. It has been suggested to provide turbines with glands of different diameters, but they were of larger diameter than the bearings. It has also been proposed to make the diameter of the glands equal to that of the bearings, for the purpose of reducing as far as possible the losses due to leakage. When the pressure at the glands is great, however, the losses due to leakage remain relatively high and the glands must be very long, which acts detrimentally more particularly in the case of large high-pressure steam or gas turbines.

These drawbacks are overcome by the present invention, by which, more particularly in the case of high-pressure turbines, the losses due to leakage can be reduced to a minimum, while the glands may be made relatively short. The main feature of the invention is that means are provided for reducing the deflection of the rotor, and that, in connection therewith, the turbine rotor has the glands of smaller diameter than the bearings. By the provision of separate supporting members outside the bearings for reducing the deflection of the shaft of the turbine rotor, the critical speed is advantageously raised and it becomes possible to adopt a particularly small diameter for the glands. For this purpose the thrust bearing or some other part of the turbine may with advantage be constructed so as to act as a supporting bearing as well.

The accompanying drawing shows diagrammatic views of two constructional examples of the invention.

Figure 1:
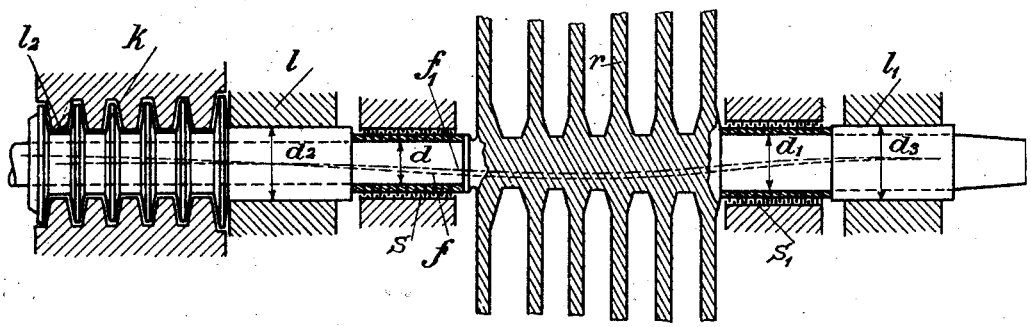
Figure 2:
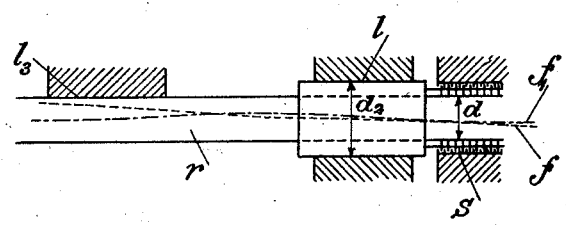

In the embodiment of the invention shown in Fig 1, $r$ is the rotor of a high-pressure turbine, in which the rotor wheels are made in one piece with the shaft. $l$ is the front and $l_1$ the back bearing of the turbine, $k$ the collar thrust bearing, $s$ the front and $s_1$ the back high pressure gland. The shaft diameters of the glands are marked $d$, $d_1$ and the bearing diameters $d_2$, $d_3$. The dotted line $f$ shows the deflection of the shaft of the turbine rotor $r$. This deflection is reduced, according to my invention, by providing outside of the bearings $l$, $l_1$, means which have the tendency to hold the center line of the rotating shaft as straight as possible. This may be effected by means of a modification of the thrust-bearing $k$ to provide a bearing section $l_2$ as indicated by heavy lines in Fig. 1, or by the provision of an upper bearing section $l_3$ placed outside of the bearing $l$ upon the shaft, as indicated in Fig. 2, these bearing sections exerting a load or pressure upon the shaft tending to maintain the center line of the shaft, straight, so that the deflection will not follow the usual line $f$, which is dotted in Figs. 1 and 2, but will rather follow the more favorable line $f_1$, which is indicated by dashes and dots. In the same measure as the deflection line is straightened, the critical speed of the turbine rotor may be increased without increasing the diameter of the shaft; or the diameter of the shaft may be reduced or be made very small, which produces the great advantage that the leakage losses can be reduced to a minimum, as with the reduction in the diameter of the shaft, the dimensions, particularly the length of the glands can be very substantially reduced, which is particularly important on the high-pressure side, where the pressure and density of the steam or other elastic fluid is relatively high, while its specific volume is relatively small. The reduction of the size of the glands further produces a great saving in installation cost, as the glands, which are necessarily of a special construction for high-pressure, are delicate and expensive elements in the high-pressure turbines. The gland diameters $d$, $d_1$ are smaller than the bearing diameters $d_2$, $d_3$ and, taking into consideration that the torsional stresses due to the mechanical transmission of energy take place from the first rotor wheel backwardly by way of the bearing $l_1$, the front gland diameter $d$ may be considerably smaller than the diameter $d_1$ of the rear gland $s_1$, the high-pressure gland $s$ which is subject to the greatest driving fluid pressure with a small specific driving fluid volume, and the shaft diameter $d$ being thus preferably the smallest.

In the same measure as the diameters of the shaft at the front gland $s$ and at the rear gland $s_1$ are reduced, the diameters of the shaft between the turbine rotor wheels or discs can also be reduced, whereby the losses due to leakages within the turbine can be reduced to the minimum. These diameters may increase gradually through the stages until they reach the dimension of the diameter $d_1$ at the rear gland $s_1$, as is indicated in Fig. 1. The rotor-shaft diameters between the discs of the turbine are not larger than the shaft diameter at the rear gland $s_1$ of the turbine, and said shaft diameters particularly at the high-pressure end of the turbine, may be even smaller than said rear gland shaft diameter $d_1$; and by making the rotor discs $r$ integral with the rotor shaft, the smallest possible rotor shaft diameters are obtained by application of the invention, as is indicated in Fig. 1. In spite of the gradually increasing shaft diameters the losses due to leakage remain low, as in correspondence with the progressive expansion of the driving fluid in the turbine the pressure of the driving fluid decreases and its specific volume increases.

In order to avoid dividing the glands on the rotor and to make their removal and replacement easier, special bushes may be mounted on the turbine shaft at the journals $l$, $l_1$ for giving the bearings the requisite diameters $d_2$ and $d_3$.

The supports for the purpose of reducing deflection, raising the critical speed or reducing the diameters of the shaft and more particularly of the glands may, of course, be provided in any number at the most suitable places and suitable parts of the turbine may be adapted and used for this purpose, such for instance as the collar thrust bearing alluded to above.

Through the invention the diameters of the turbine rotor shaft may be made as small as possible, while the most suitable shape is given to the shaft from the point of view of strength.

What I claim is:—

1. An elastic fluid multistage turbine comprising a single rotor, a rigid shaft for said rotor, glands for said rotor shaft, bearings for said rotor shaft and supporting means for reducing the deflection of said rotor shaft.

2. An elastic fluid multistage turbine comprising a single rotor, a rigid shaft for said rotor, glands on said rotor shaft adjoining said rotor, bearings adjoining said glands and supporting means outside of said bearings for reducing the deflection of the rotor shaft.

3. An elastic fluid multistage turbine comprising in combination a rotor having rotor discs on a rigid shaft, glands on said shaft adjoining said rotor discs, bearings adjoining said glands and means outside of said bearings for reducing the deflection of said rotor shaft.

4. An elastic fluid multistage turbine comprising in combination a rotor consisting of rotor discs on a shaft, said rotor discs forming an integral piece with the shaft, glands on said shaft adjoining said rotor discs, bearings adjoining said glands and means outside of said bearings for reducing the deflection of said rotor shaft.

5. An elastic fluid multistage turbine comprising a single rotor, a rigid shaft for the rotor, glands on the shaft of the rotor adjoining the latter, bearings adjoining the glands having a larger diameter than the glands, and means outside of the bearings for reducing the deflection of the rotor shaft.

6. An elastic fluid multistage turbine comprising a single rotor, a rigid shaft for the rotor, glands adjoining the rotor, said glands being of a smaller diameter than the bearing-diameters of the shaft, and supports outside of the bearings tending to maintain the rotor shaft straight.

7. An elastic fluid turbine comprising a rotor, a shaft for the rotor, glands adjoining the rotor, bearings outside of the glands having a larger diameter than the latter, and a thrust-bearing outside of said bearings adapted to reduce the deflection of the rotor shaft.

8. An elastic fluid multistage turbine comprising a rotor consisting of a plurality of discs integral with the rotor shaft, glands on the shaft adjoining the rotor discs, bearings outside of the glands, the bearing-sections of the shaft being of larger diameter than the gland-sections, the shaft between the rotor discs not being larger than the larger gland-diameter, and supporting means outside of the bearings for reducing the deflection of the shaft.

9. An elastic fluid multistage turbine comprising a rotor consisting of a plurality of discs integral with same, glands on the shaft adjoining the rotor discs, and bearings outside of the glands, the bearing-sections of the shaft being of larger diameter than the gland-sections, and the diameters of the shaft portions between the rotor-discs increasing gradually from the gland at the high-pressure side to the gland at the low pressure side, but none of said diameters being larger than the diameter of the low pressure gland.

10. An elastic fluid multistage turbine comprising a rotor consisting of a plurality of discs formed on the shaft, glands for the shaft adjoining said rotor discs, bearings for said rotor, outside of and adjoining said glands, the bearing-sections of said shaft being of larger diameter than the gland sections, and the diameters of the shaft portions between the rotor discs increasing gradually from the glands at the higher pressure side towards the low pressure gland, but none of said diameters being larger than the diameter of the latter gland, and supporting means outside of the bearings for reducing the deflection of the shaft.

11. An elastic fluid multistage turbine comprising a rotor consisting of a plurality of discs formed on the shaft, glands for the shaft adjoining said discs, bearings for said rotor, outside of and adjoining said glands, the diameters of the shaft portions between the rotor discs increasing gradually from the gland at the high-pressure side to the gland at the lower-pressure side, but none of said diameters being larger than the diameter of the low pressure gland, and supporting means outside of the bearings for reducing the deflection of the shaft.

12. An elastic fluid turbine comprising a rotor consisting of a plurality of discs formed on the shaft, glands for said shaft adjoining said rotor, bearings for said rotor outside of and adjoining said glands, the diameters of the shaft portions between the rotor discs being not larger than the larger gland-diameter, and means outside of said bearings for reducing the deflection of the shaft.

13. An elastic fluid turbine comprising a rotor, a shaft for said rotor, glands on said rotor shaft adjoining said rotor, bearings adjoining said glands and a thrust-bearing outside of said bearings adapted to reduce the deflection of the rotor shaft.

14. An elastic fluid multistage turbine comprising a rotor, a shaft for said rotor, glands on said rotor shaft adjoining said rotor, bearings adjoining said glands and supporting means outside of said bearings for reducing the deflection of the rotor shaft, the diameter of the glands on the high pressure side of the rotor being smaller than the diameter of the adjoining bearing.

15. An elastic fluid multistage turbine comprising a rotor, a shaft for the rotor, glands adjoining the rotor, bearings outside of the glands, and a thrust bearing outside of said bearings adapted to reduce the deflection of the rotor shaft, the diameter of the gland on the high pressure side of the rotor being smaller than the diameter of the adjoining bearing.

In testimony whereof I have signed my name to this specification.

FRANZ LÖSEL.

Witnesses:
  QUIT DEMASI,
  MARIE DEMASI.